United States Patent
Clinton

[15] 3,645,664
[45] Feb. 29, 1972

[54] HEATING APPARATUS FOR VAPORIZING PROPANE FUEL AND THE LIKE

[72] Inventor: John Rodney Clinton, P. O. Box 27, Leaburg, Oreg. 97401

[22] Filed: May 28, 1970

[21] Appl. No.: 41,206

[52] U.S. Cl..........................431/209, 126/271.2, 431/233, 431/248
[51] Int. Cl..........................................F23d 11/44
[58] Field of Search.................431/209, 233, 234, 235, 242, 431/243, 247, 248; 126/271.1, 271.2

[56] References Cited

UNITED STATES PATENTS

| | | | |
|---|---|---|---|
| 1,546,038 | 7/1925 | Smith | 431/242 X |
| 2,460,451 | 2/1949 | Farrell | 431/243 X |
| 3,486,497 | 12/1969 | Pivonka | 431/248 X |
| 3,027,932 | 4/1962 | Huber | 431/243 X |
| 2,558,359 | 6/1951 | Henneman et al. | 431/243 X |

Primary Examiner—Edward G. Favors
Attorney—James D. Givnan, Jr.

[57] ABSTRACT

Heating apparatus for vaporizing fuel is disclosed including a plenum of sleevelike shape having a jacket spaced from the outer sleeve wall. A burner discharges a flame through the sleeve with diverting means at the opposite end of the plenum to redirect the flame generated heat in an opposite direction for complete heating of the fuel in the sleevelike plenum. The vaporized fuel is supplied to burners as shown adjustably disposed above the crop to be flame treated.

8 Claims, 7 Drawing Figures

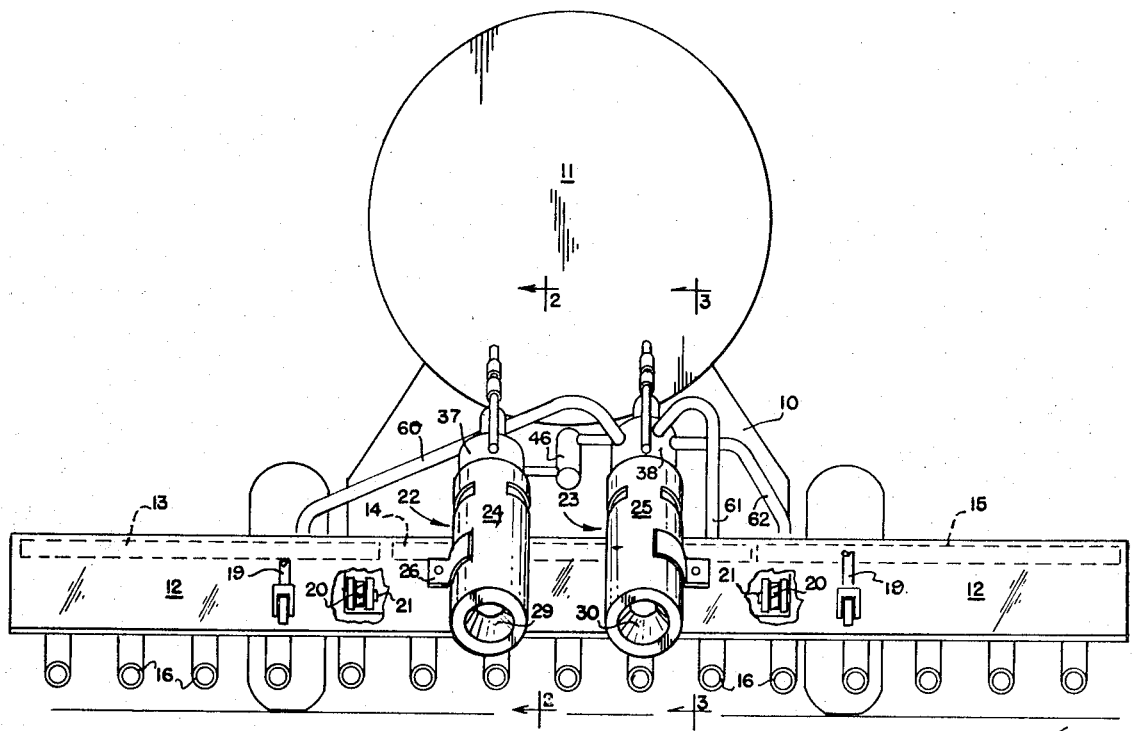
Fig. 1
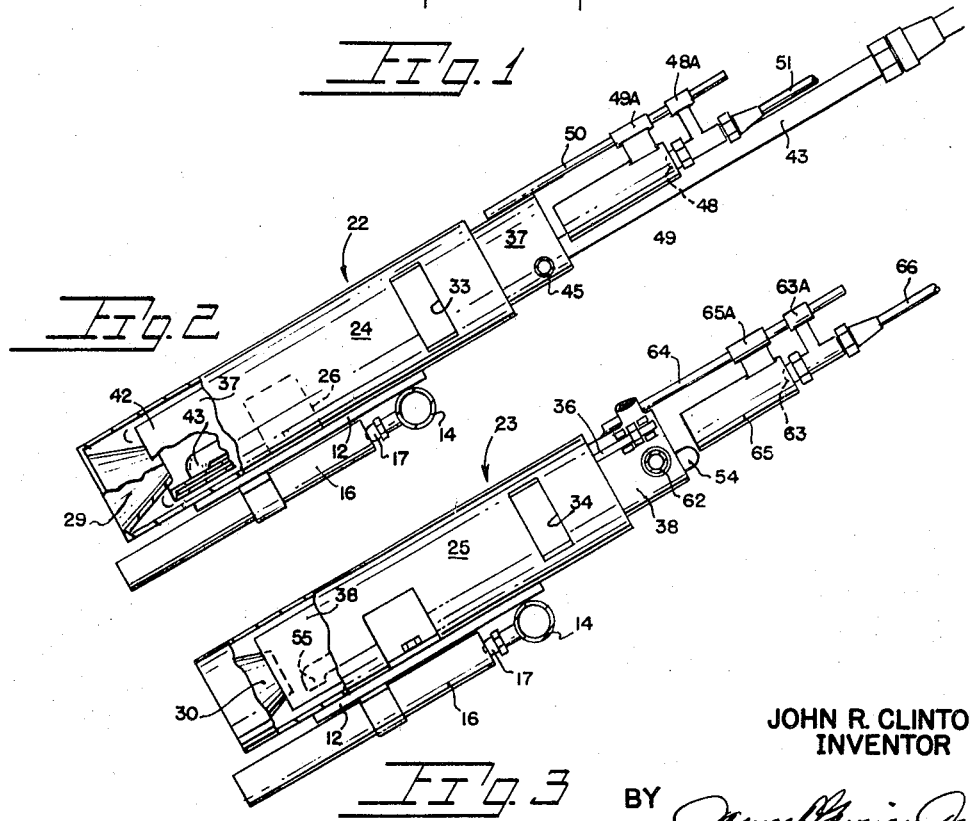
Fig. 2
Fig. 3
JOHN R. CLINTON
INVENTOR
BY
AGENT

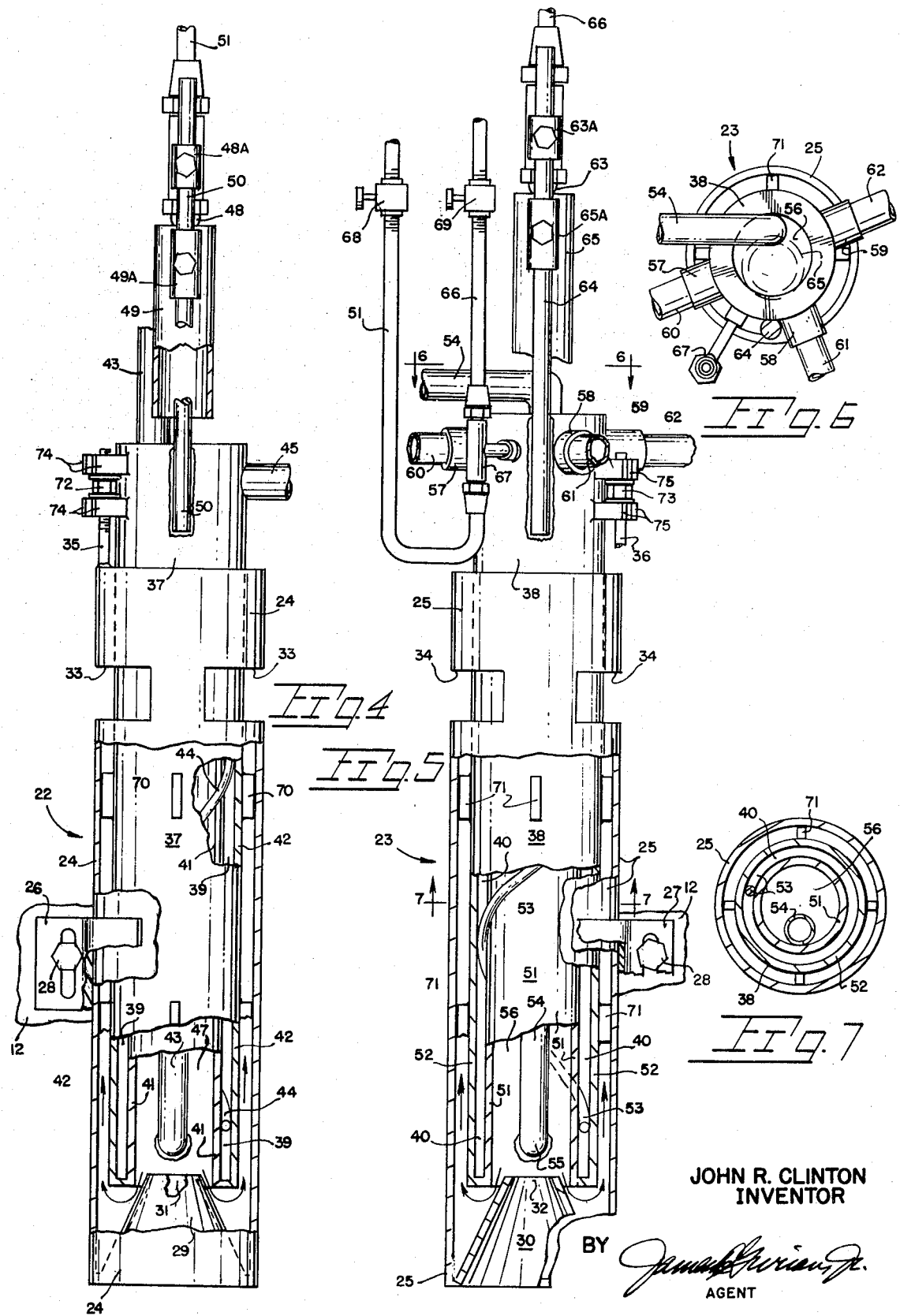

HEATING APPARATUS FOR VAPORIZING PROPANE FUEL AND THE LIKE

BACKGROUND OF THE INVENTION

The present invention relates generally to an apparatus for the heating and vaporizing of fuel of the type stored in a pressurized state for more efficient combustion of same.

The invention is disclosed in association with agricultural machinery used for the flame treatment of certain field crops. Such flame treatment is termed flaming and is widely practiced for weed control and for the destruction of crop damaging organisms. A moving flame passes close to each plant subjecting same to high temperature for only a short duration. Flaming as used in weed control is termed flame cultivation. Other flame treatment results in bacteria or fungus spores on the plant being destroyed.

For such flame treatment of crops it is common practice to utilize a farm vehicle having a fuel storage tank or tanks thereon with a multitude of burners being disposed transversely of the vehicle centerline to treat a wide swath with each pass of the trailer through the field. The burners are adjustably supported to achieve the most efficient flame treatment of the particular crop being treated. A further variable is the duration of flame on the plant as determined by the speed of the trailer. Further, the fuel line pressure may be varied to alter the flame action.

Propane gas is now used for agricultural flaming on a sizable scale by reason of its portability and low cost. The fuel is kept in a liquid state under pressure in the vehicle storage tank. Periodic refilling of the propane storage tank or tanks is done in the field with refillings normally being required every few hours to accomplish flame treatment of a crop. While the cost of propane gas is low, a considerable expense is encountered in the periodic servicing charges made by the gas supplier. Fuel economy thus becomes of importance.

Of added importance, over and above fuel economy, is a further object of the present invention to achieve more efficient combustion of the propane fuel. The resulting hotter flame permits a shorter exposure of each plant to the flame to avoid igniting same but yet effective to destroy the infecting organism. Igniting of the plant even for a short period causes, in addition to plant damage, residual burning of the plant resulting in smoke for several minutes after passage of the flame. In agricultural areas where flaming of crops is practiced the problem of smoke has resulted in governmental agencies enacting restrictions on field burning, for example, permitting such burning only under favorable wind conditions.

Further, in regard to reducing air pollutants resulting from field burning, the propane gas itself is efficiently burned with the present apparatus with little or no smoke being released to the atmosphere.

While the prior art teaches the use of various types of field burners the matter of heating the propane fuel prior to combustion and under pressure has been largely disregarded. Heretofore any heating of the fuel has been done in an inefficient manner.

SUMMARY OF THE INVENTION

The present invention is embodied within means for directing a continuous flow of fuel through a plenum with heated surfaces of the plenum transferring heat to the fuel. Further, the fuel is rapidly converted from its liquid state to a vapor while remaining under pressure, in which state it is transferred to the crop framing nozzles. Fuel is directed through an elongate, heated plenum of sleeve shape about which a flame is interiorly and exteriorly circulated. The fuel supporting said flame is drawn off at a point whereat the fuel is at its highest temperature. Means are also provided for varying the path of the flame and heat about the walls defining the plenum.

An important object of the present invention is to provide an efficient fuel heating apparatus wherein a continuous flow of fuel is heated while under pressure and prior to being directed to burner feeding manifolds.

A further object is the provision of means within the plenum to insure complete exposure of the fuel flow to the heated walls of the plenum.

An additional object of the invention resides in the provision of a cylindrical jacket and diverting means configured for accomplishing the routing of the flame and heat path in a reverse course along the walls of the plenum chamber. For optimum heating efficiency the relative position of the plenum and its jacket may be varied.

BRIEF DESCRIPTION OF THE DRAWINGS

In the accompanying drawings,

FIG. 1 is an elevational view of the rearward end of a trailer supporting a propane storage tank and having a field burning assembly disposed transversely across the trailer with the present heating apparatus in place thereon, FIGS. 2 and 3 are views taken respectively along lines 2—2 and 3—3 of FIG. 1 with each similarly showing a side elevational view of a heater unit, FIGS. 4 and 5 are plan views respectively of FIGS. 2 and 3 taken perpendicularly to the inclined axes of the heater units shown therein, FIG. 6 is an end view of the upper end of the heater unit of FIG. 5 taken downwardly along horizontal line 6—6, and FIG. 7 is a sectional view taken along line 7—7 of FIG. 5 and showing details typical of both heater units.

DESCRIPTION OF THE PREFERRED EMBODIMENTS

With continuing reference to the drawings wherein applied reference numerals indicate parts similarly identified in the following specification, the reference numeral 10 indicates an agricultural vehicle constituting a mobile support for a liquid fuel storage tank at 11 charged with propane gas.

A field burning assembly carried by vehicle includes an elongate, movable burner support 12 extending transversely of the vehicle centerline. Carried subjacently and extending lengthwise of support 12 are fuel manifolds 13, 14 and 15 each supplied by a separate supply line as later explained. Also on the underside of support 12 is a series of spaced apart burners 16, which as typically shown in FIGS. 2 and 3, include fuel nozzles at 17 for the discharge of vaporized fuel from a manifold into each of the cylindrical mixing chambers of the burners.

The support 12 is pivotally mounted at 20 to the vehicle chassis for swinging movement of the support 12 in a vertical plane about the horizontal axis of pivot pins 21 for vertical positioning of the burners 16. For imparting such swinging movement to support 12, arms at 19 are connected at their upper ends to suitable powered means (not shown) carried by the vehicle. Depending on the characteristics of the crop being treated the support 12 will be positioned with respect to the ground for the desired flame coverage. The foregoing structure constitutes simply associated equipment for use with the present invention and is not intended as a limitation of the use of the invention.

The fuel heating apparatus embodying the present invention includes a pair of heater units 22–23 in place on the support 12. The heater units are similar, each including jackets at 24–25 of cylindrical shape held in place in an adjustable manner on the support 12 by means of slotted brackets 26–27 through which extend bolts 28.

Flame diverting means are provided in the lower end of each jacket in the form of a frustoconical structure at 29–30 with central openings at 31–32. Adjacent the opposite ends of the jackets are vent openings 33–34 through which a portion of the flame or the heat therefrom is exhausted. At the upper end of each jacket are threaded studs 35–36 fitted with nuts 35A–36A comprising part of adjustment means as later described.

Housed within the jackets of the first and second heater units are hollow sleeves structures 37–38 each spaced inwardly from its jacket and defining an elongate annular plenum at 39–40. The sleeves of the first and second heater units are described individually as follows.

Sleeve 37 in the first heater unit comprises inner and outer cylindrical sleeve walls at 41–42 of approximately 4 and 5 inch outside diameters in one form of the invention with said outer wall being circumferentially spaced from the jacket interior a distance of approximately three-eighths inch or so. The inner and outer sleeve walls are closed at their coterminus ends to provide its closed plenum 39.

Extending down through the central bore 47 of the sleeve is a fuel supply conduit 43 which is in open communication with the sleeves lower end. As shown in FIG. 2 conduit 43 is supplied by a flexible fuel line leading from the supply tank 11 via conventional flow control valves and pressure regulating controls (not shown).

In one workable form of the invention the sleeve walls 41–42 are spaced approximately three-eighths of an inch. Within the plenum thereby formed a helically shaped rod 44 of three-eighths inch diameter is disposed extending substantially the length of the sleeve and imparts a helical direction to the fuel flow within the plenum. The foregoing dimension of the plenum is provided only for purposes of example and obviously may be varied with other embodiments of the invention. At the upper end of sleeve 37 a fuel outlet is provided in the form of a pipe section 45 which, as shown in FIG. 1, directs fuel into the lower end of a fluid trap 46 (FIG. 1).

In substantial alignment with and heating the sleeve 37 is a burner consisting of a nozzle 48 and mixing shroud 49 both of which are adjustably mounted by collars 48A and 49A on a support rod 50 mounted on the sleeve. A fuel line 51 supplies the burner with heated, vaporized fuel.

With regard to the second heater unit the sleeve 38 is substantially similar to the first described sleeve with the plenum 40 being defined by inner and outer cylindrical sleeve walls 51–52. A rod member 53 extends in a helical manner between the walls terminating adjacent the ends of the sleeves and serving the same function as helical rod member 44 as earlier described.

A flow of heated fuel is directed from the first heater unit through fluid trap 46 and through a conduit 54 which extends downwardly for passage through the sleeve bore 56 for delivery of the fuel to the lower end of plenum 40 at an elbow 55.

Arcuately spaced apart at the upper terminus of sleeve 38 are sockets 57–59 each of which receives the inlet fittings of manifold supply lines 60–62 with the latter supplying heated vaporized fuel respectively to the fuel manifolds 13–15.

In similarity to the burner for heating the first heater unit, the second heater unit includes a burner comprising a nozzle 63 supported by an adjustable collar 63A on a support rod 64 with a mixing shroud 65 being supported in a likewise manner at 65A on the rod 64 which is welded adjacent its lower end to the hollow sleeve 38. Setscrews as shown may be used to adjustably lock each of the collars of the burners to the rods 50 and 64 upon the desired relationship to the sleeve being determined. The supplying of each of the burner nozzles 48 and 63 with heated fuel is accomplished by means of the aforementioned fuel line 51 and a second line 66 drawing from the uppermost end of sleeve 38 by means of a Tee at 67 in open communication with the plenum 40. Needle valves 68–69 (FIG. 5) in lines 51 and 66 allow for regulation of the fuel flow to nozzles 48 and 63 to avoid overheating of the fuel.

The sleeves 37–38 are circumferentially spaced from the inner walls of their respective jackets 24–25 by radially spaced lugs as at 70–71 which further permit relative sliding movement between the sleeve and its jacket as accomplished by the following described adjustment means.

The threaded shafts 35–36 each carry a nut 72–73 confined between upper and lower pairs of spaced apart projections at 74–75 which results in the threaded shafts 35–36 moving axially upon nut rotation which in turn moves the jackets axially of their sleeves 37–38. Nuts 28, or course, must be temporarily loosened prior to adjustment of the jackets. As earlier mentioned the clearance between the frustoconical structure 29–30 and the lower ends of their respective sleeves 37–38 thereby may be varied to achieve the optimum flame and heat passage around the ends of the sleeves (illustrated by applied arrows in FIGS. 4 and 5).

In the flaming of a crop the fuel, in liquid form, is admitted via line 43 into the first heater unit under approximately 35–40 p.s.i. as controlled by conventional pressure reducing means as earlier mentioned. The propane liquid initially entering the heater units oxidizes to support a flame at nozzles 48 and 63. After a few seconds of heating, the sleeves 37–38 are fully heated for vaporization of the fuel prior to its distribution via lines 60, 61 and 62. Depending on the crop being treated the support 12 will be raised or lowered to locate the burners 16 as desired.

The fuel passes through each heater unit in a helical course and through the relatively narrow walled plenum with the walls of same efficiently conducting heat to the passing fuel.

Depending upon the flow rate of fuel to be vaporized it is practical in some applications to utilize a single heater unit the dimensions of which may of course be altered from the foregoing.

Having thus described the invention what I desire to secure under a Letters Patent is:

1. A heater unit for propane fuel and the like comprising in combination,
   a heater jacket,
   an elongate plenum defining structure housed substantially within and spaced from said jacket with the plenum thereof receiving fuel at one of its ends, said structure having first and second cylindrical walls,
   a burner disposed adjacent said one end of the plenum structure for directing a flame initially along said first wall of the plenum structure,
   heat diverting means adjacent the opposite end of the plenum structure and cooperable therewith for diverting the course of the flame generated heat along said second wall of the plenum structure, and
   adjustment means operable to vary the clearance between the plenum structure and the heat diverting means to vary the volume of heat directed along the second surface of the plenum.

2. The heater unit as claimed in claim 1 wherein said heat diverting means comprises a hollow conical structure having its reduced open end disposed so as to divert the heat generated by said burner outwardly for ultimate passage along the second wall of said plenum defining structure.

3. The heater unit as claimed in claim 2 additionally including means within said plenum structure to impart a helical component to the path of the fuel.

4. The heater unit as claimed in claim 2 wherein said hollow conical structure is of frustoconical shape.

5. A heating apparatus for propane fuel and the like for vaporizing of same while under pressure and prior to combustion,
   first and second heating units each including,
      a heater jacket,
      an elongate plenum defining structure housed within and spaced from said jacket with the structure having first and second circumferentially spaced apart cylindrical walls,
      a burner disposed adjacent said one end of the plenum structure for directing a flame initially along said first wall of the plenum structure,
      heat diverting means adjacent the opposite end of the plenum structure and cooperable therewith for diverting the course of the flame generated heat along said second wall of the plenum structure, and
   fuel conduit means supplying the plenum structure of the first heating unit and additional conduit means extending intermediate ends of the plenum structures for delivery of fuel to the plenum structure of the second heating unit.

6. The heating apparatus as claimed in claim 5 wherein said fluid conduit means extends for a segment of its length interiorly of said first wall of the plenum structures of the first and second heating units.

7. The heating apparatus as claimed in claim 5 wherein said heat diverting means comprises a hollow conical structure having its reduced end disposed so as to divert the heat generated by said burner outwardly for ultimate passage along the second walls of said plenum defining structures.

8. The heating apparatus as claimed in claim 5 wherein said plenum structures each include means intermediate the first and second walls for imparting a helical component to the path of the fuel being heated.

* * * * *